March 6, 1928. 1,661,417
B. A. EVANS ET AL
APPARATUS FOR MOUNTING INSERTS IN AND DRILLING BATTERY JAR VENT CAPS
Filed July 7, 1927 4 Sheets-Sheet 3

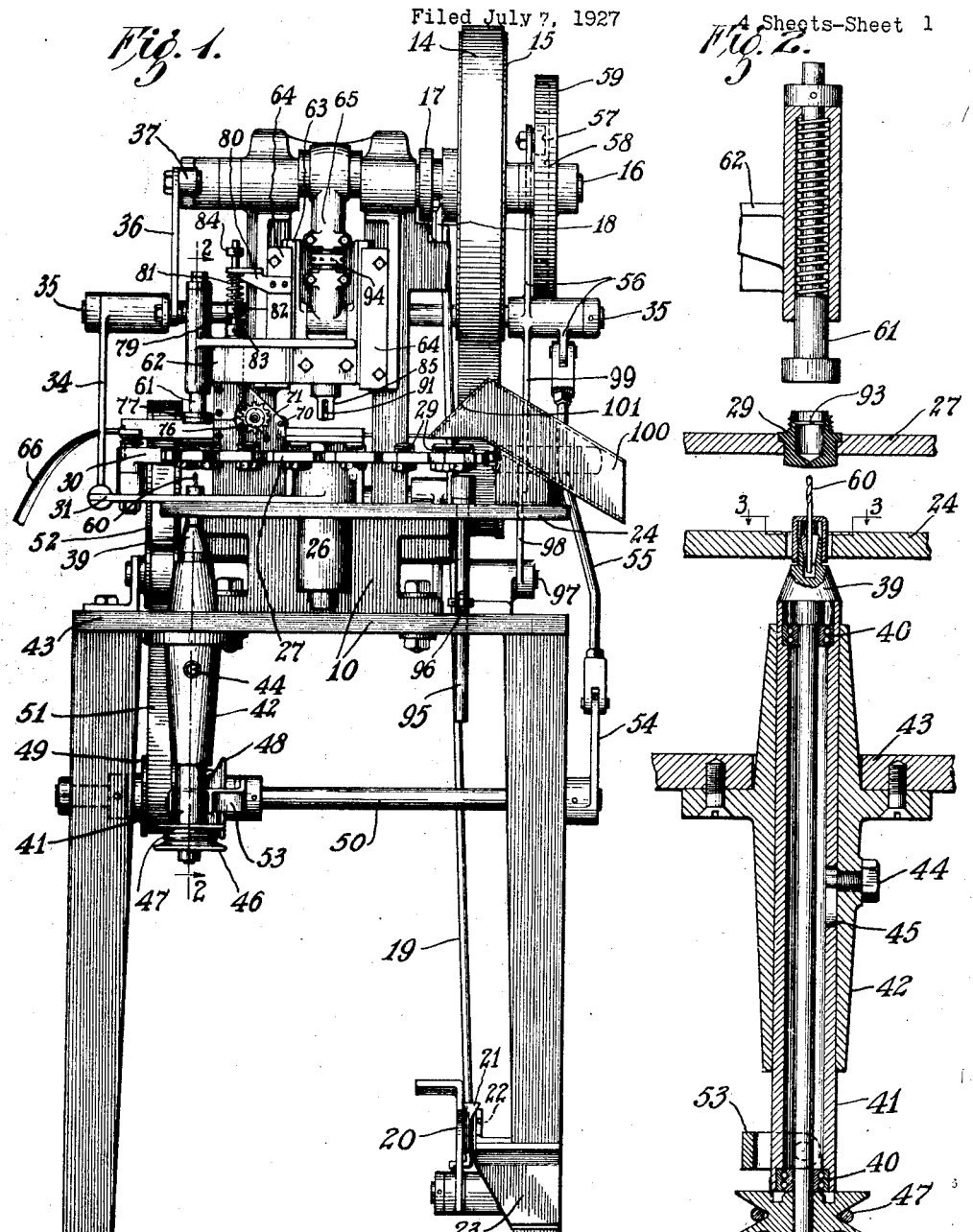

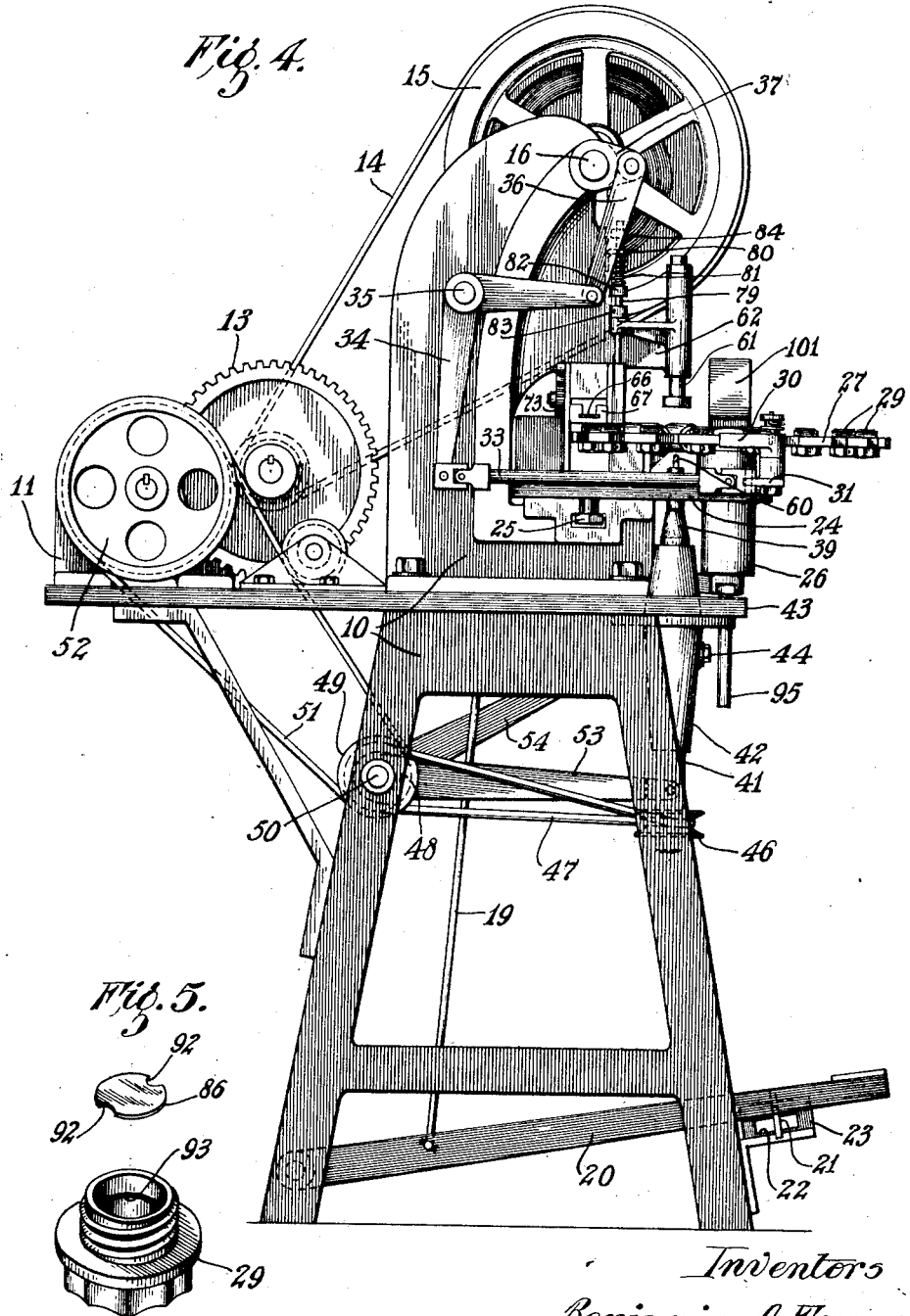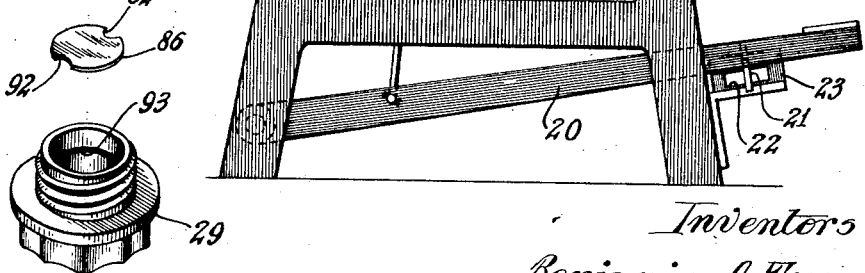

Inventors,
Benjamin A. Evans
William H. Slabaugh
By Pierson, Eakin & Avey Attys.

March 6, 1928.  1,661,417
B. A. EVANS ET AL
APPARATUS FOR MOUNTING INSERTS IN AND DRILLING BATTERY JAR VENT CAPS
Filed July 2, 1927   4 Sheets-Sheet 4
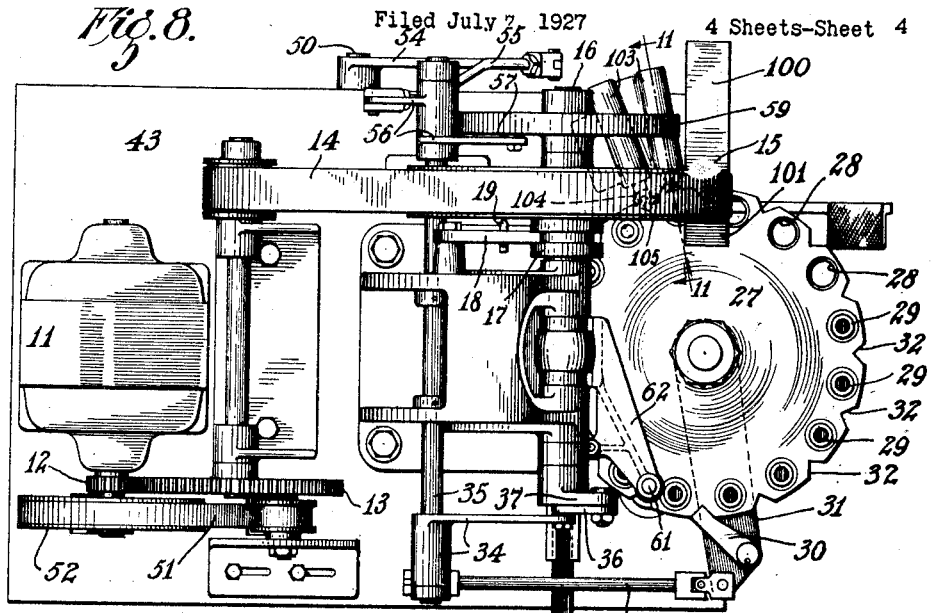
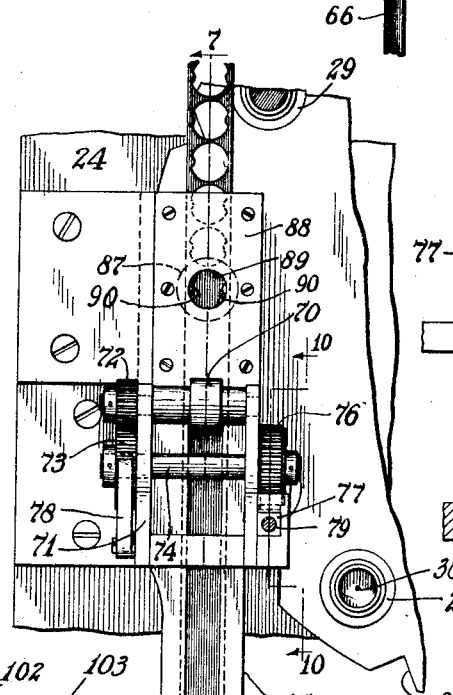
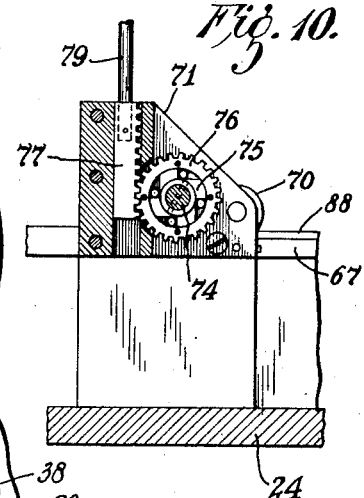
Inventors
Benjamin A. Evans
William H. Slabaugh
By Pierson, Eakin & Avery
Att'ys Patented Mar. 6, 1928.

1,661,417

UNITED STATES PATENT OFFICE.

BENJAMIN A. EVANS AND WILLIAM H. SLABAUGH, OF CUYAHOGA FALLS, OHIO, ASSIGNORS TO THE B. F. GOODRICH COMPANY, OF NEW YORK, N. Y., A CORPORATION OF NEW YORK.

APPARATUS FOR MOUNTING INSERTS IN AND DRILLING BATTERY-JAR VENT CAPS.

Application filed July 7, 1927. Serial No. 203,993.

This invention relates to the manufacture of vent caps, usually in the form of molded hollow screw plugs, which are employed in battery covers as vented closures for the filling holes, each plug being provided with a small vent aperture in its head for venting the battery to prevent super-atmospheric or subatmospheric pressure therein and with a baffle plate set in an annular groove molded in the inner face of the plug, the baffle being adapted to constitute a partial closure member for a splash chamber within the plug, to prevent the electrolyte from splashing out through the vent aperture.

Our chief objects are to provide improved procedure and apparatus for forming the baffle plates and mounting them in the plugs; to provide improved procedure and apparatus for drilling the vent apertures in the plugs; to provide for simultaneously drilling the vent apertures and forming and mounting the baffle plates in the same machine; to provide a largely automatic machine for continuous operation upon a succession of the plugs or vent caps; to provide for regularity of operation and uniformity of product; and to provide further, more detailed advantages which will be manifest.

Of the accompanying drawings:

Fig. 1 is a front elevation of a machine embodying and adapted to carry out our invention in its preferred form.

Fig. 2 is a vertical section on line 2—2 of Fig. 1.

Fig. 3 is a section on line 3—3 of Fig. 2.

Fig. 4 is an elevation of the machine from the left of Fig. 1.

Fig. 5 is a perspective view of the battery plug and a baffle plate adapted to be mounted therein.

Fig. 8 is a plan view of the machine.

Fig. 9 is a plan view of parts of the machine including a work-carrying turret and means for feeding a strip of the baffle-plate material.

Fig. 10 is a section on line 10—10 of Fig. 9.

Fig. 11 is a section on line 11—11 of Fig. 8.

Figure 6:
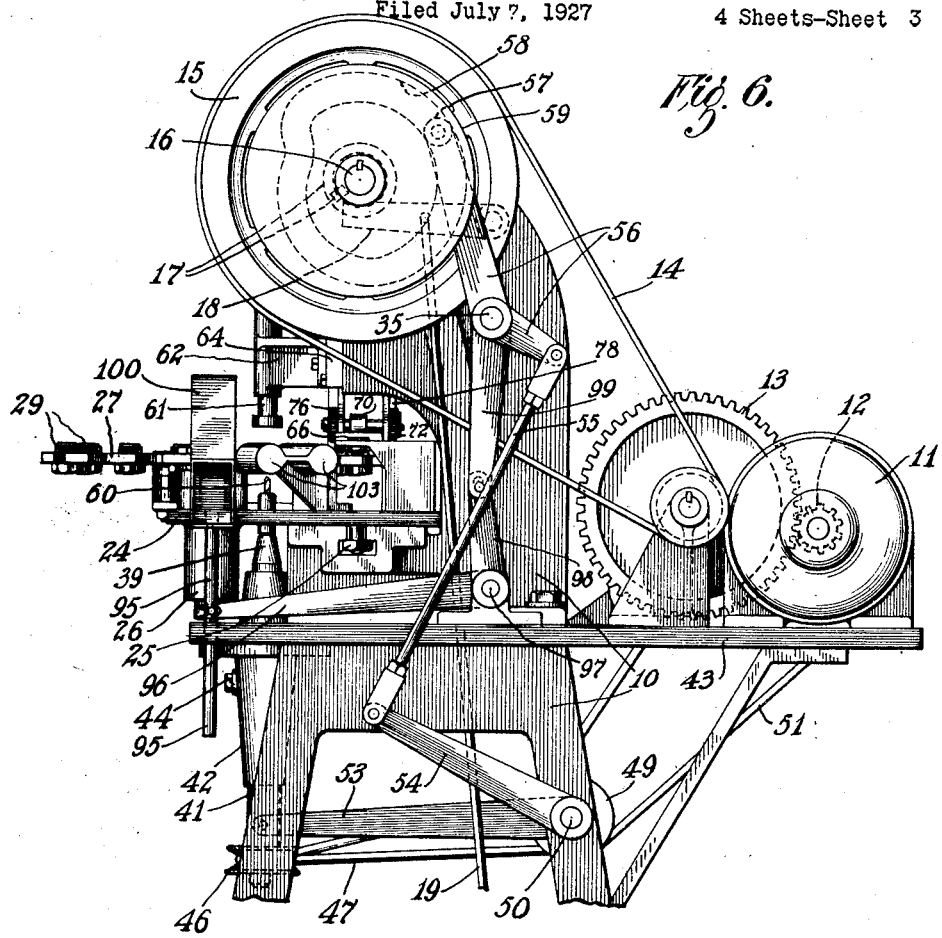
Fig. 6 is an elevation from the right of Fig. 1.

Referring to the drawings, the machine comprises a frame structure 10 upon which are mounted a motor 11 having drive connection through reduction gears 12, 13 and a belt 14 with a main-drive pulley 15 loosely journaled upon a main-drive and crank shaft 16, a wedged-pin clutch 17 being interposed between the drive pulley 15 and the shaft and having its actuating arm 18 connected by a pull rod 19 with a starting treadle 20 adapted to be latched down in clutch-engaging position by a cam latch member 21 secured to the treadle and adapted to engage in a slot 22 formed in a bracket 23 projecting from a part of the machine frame.

Figure 7:
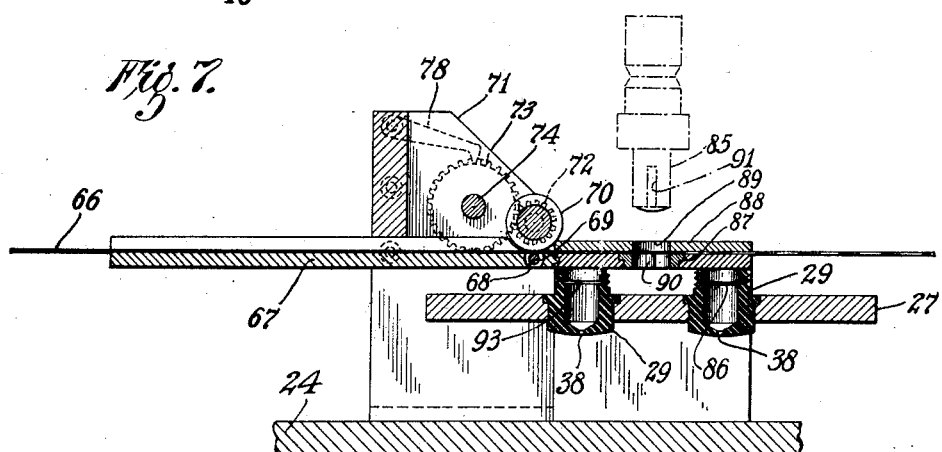
Fig. 7 is a vertical section on line 7—7 of Fig. 9.

A plate 24 carrying certain parts of the mechanism is secured upon the frame by bolts 25, 25 having their heads mounted in an under-cut slot formed in the frame and the plate 24 is formed with a vertical bearing 26 for a turret plate 27 formed in its outer margin with a circumferential series of equally spaced apertures or sockets 28, 28 adapted to seat respective battery plugs or vent caps 29, 29, as is shown clearly in Fig. 7.

The turret plate 27 is adapted to be periodically indexed by a spring-pressed pawl 30 mounted upon the outer end of an arm 31 which is journaled upon the stem of the turret plate 27 between the turret plate and the supporting plate 24, the pawl 30 being adapted to engage in ratchet notches 32, 32 formed in the margin of the turret plate and the arm 31 having its outer end connected by a link 33 with one arm of a bell crank lever 34 which is loosely fulcrumed upon a shaft 35 and has its other arm connected by a pitman link 36 with a crank 37 secured upon one end of the crank shaft 16.

For drilling in the respective vent caps 29 vent apertures such as are shown at 38, 38 (Fig. 7), as the vent caps in the turret are held in succession at the drilling position, a drill holder 39 has its stem mounted, with roller bearings 40, 40, in a vertical sleeve 41 which is mounted for sliding movement in a guide member 42 mounted in a hole formed in a horizontal member 43 of the machine frame, the sleeve 41 being held against rotation by a screw 44 having its projecting inner end extending into a slot 45 formed in the adjacent wall of the sleeve (Fig. 2).

Secured on the lower end of the stem of the drill holder 39 is a belt pulley 46 connected by a round belt 47 with one of a pair of twin pulleys 48, 49 which are loosely journaled upon a shaft 50, the pulley 49 being connected by a belt 51 with a belt pulley 52 secured upon the motor shaft. Pulleys 46 and 48 of the belt 47 are positioned at about the same elevation, so that the drill holder 39 may be driven by the belt 47 although the drill holder is raised and lowered in the guide member 42.

For raising and lowering the drill holder the slidable sleeve 41 in which it is journaled has hinged to the lower end thereof the outer end of a lifting arm 53 which is secured upon the shaft 50, and the said shaft has secured upon another part thereof a rocker arm 54 which is connected by a link 55 with one arm of a bell crank lever 56 loosely fulcrumed upon the shaft 35 and having upon its other arm a cam roller 57 mounted in a cam groove 58 formed in a cam disk 59 secured upon the main-drive and crank shaft 16.

Mounted in the drill holder 39 in a well known manner is a drill 60, the construction being such that the rotating drill will be raised to drill the aperture 38 in each of the vent caps as they are successively held in the drilling position.

For holding each vent cap 29 in its socket in the turret plate 27 against the force of the drill coming up from below, a spring-backed presser foot 61 adapted to bear yieldingly upon the upper end of the vent cap 29 is mounted in a bracket 62 projecting from a slide 63 which is mounted in vertical guide ways on the machine frame and retained by cap plates 64, 64, the slide 63 being connected with a crank portion formed in the shaft 16 by a variable length pitman 65 (Fig. 1), the slide 63 being so timed as to bring the presser foot 61 to bear upon each vent cap 29 shortly before the vent cap is engaged by the drill 60.

For feeding a strip 66 of hard rubber or semi-hard rubber stock past a stamping position at a different part of the turret's orbit from that of the drill 60, the machine is provided with a guide plate structure 67 formed with an under-cut guide way for the strip 66 and loosely journaled in a recess 68 formed in the structure 67 (Fig. 7), with its upper side approximately even with the floor of the guide way, is a small roll 69, adapted to coact, to grip the strip 66 for the forward feeding thereof, with a trunnioned drive roll 70 journaled in a double bracket 71 which rises from the guide plate structure 67, and one of the trunnions of the roll 70 has secured thereon a gear 72 meshed with a gear 73 which is secured upon a shaft 74 mounted in the double bracket 71 and having secured on its other end the inner member 75 (Fig. 10) of a ball clutch of which the outer member 76 is formed with gear teeth which are meshed with a vertical rack 77 mounted in a guide way formed in the bracket 71. A pawl 78 (Figs. 7 and 9) is mounted upon the bracket 71 and adapted to engage the gear 73 to prevent reverse movement of the strip feeding roll 70 in the return movement of the ball clutch member 76.

The rack 77 is secured upon the lower end of a bar 79 which is slidably mounted in the bracket 62 of the slide 63 and in a stationary bracket 80 (Figs. 1 and 4) projecting from the machine frame. The said bar 79 is urged downward by a compression spring 81 interposed between the bracket 80 and a collar 82 secured upon the bar. Also secured upon the bar below the collar 82 is a collar 83 adapted to be engaged by the upper face of the bracket 62 to lift the rack in the latter part of the upward movement of the slide 63 (see Fig. 1), the bar 79 having secured upon the upper end thereof a collar 84 adapted to abut the upper face of the bracket 80 to stop the downward movement of the rack before the completion of the downward movement of the slide 63, the lost motion between the bracket 62 and the collar 83 being such that each forward movement of the strip 66 will be delayed until the rising movement of the slide 63 has cleared from the strip a punch 85 which is mounted upon and projects downwardly from the slide 63 and is adapted to punch from the strip 66 the successive baffle plates such as the plate 86 shown clearly in Fig. 5.

For coaction with the punch 85 to punch out the baffle plates 86, the guide plate structure 67 has set in an aperture therein a female die 87 (Fig. 7), and mounted on the guide plate structure 67 is a hold-down or stripper plate 88 formed with a guide aperture 89 directly over the aperture of the die 87.

The die 87 is formed with diametrically opposite, inwardly projecting elements of which one is shown at 90 in Fig. 7 and the punch 85 is formed with complemental slots of which one is shown at 91, the die and punch thus being adapted to form diametrically opposite notches 92, 92 (Fig. 5) in the baffle plate 86, in order that the latter may be sprung into an annular groove 93 molded in the inner face of the vent cap 29 and in order to provide vent communication between the interior of the battery and the splash chamber within the vent cap when the vent cap is mounted in the battery cover.

The parts are so constructed and arranged that when the turret plate 27 is stopped with one of the vent caps mounted therein at the drilling position, another of the vent caps will be directly under the die 87, so that continued downward movement of the punch 85 will force the baffle plate 86 through the die and into the vent plug, the lower end face of the punch 85 being spherically rounded, as shown clearly in Fig. 7, so that it will slightly deform the baffle plate 86 for the passage of the latter through the die and into the vent cap, the baffle plate then flattening out when it reaches the annular groove 93 in the vent cap, its margins thus being caused to enter and seat in the groove 93 so as to be retained therein as the punch 85 is lifted, the lowermost position of the punch 85 being so controlled by adjustment of the length of the pitman 65 (Fig. 1), by means of a turn-buckle device 94, as to cause the punch to force the baffle plate into but not beyond the annular groove 93.

For removing the successive vent caps 29 from the turret plate 27 after the mounting of the baffle plates 86 therein by the punch 85, a vertical plunger 95 (Figs. 1, 4 and 6) is slidably mounted in the horizontal frame member 43 and in the supporting plate 24 of the turret at a suitable position to lift one of the vent caps from the turret plate each time that the latter is stopped for a drilling and a baffle-inserting operation, and the plunger 95 has pin-and-slot hinge connection with an arm 96 secured upon a rock shaft 97 which has secured upon another part thereof an arm 98 (Figs. 1 and 6) of which the outer end has pin-and-slot connection with an arm 99 projecting from the hub of the bell crank lever 56, for raising and lowering the plunger 95 in proper timed relation to the vertical reciprocation of the slide 63 and the drill holder 39.

To receive each vent cap as it is lifted from the turret plate 27 by the plunger 95 an inclined chute 100 is positioned with its upper end over the turret plate 27 at the position of the plunger 95, the upper end of the chute being formed as a hood open below to receive the vent cap and formed with an inclined wall 101 (Fig. 1) adapted to crowd the vent cap off of the head of the rising plunger 95, so that the vent cap will fall onto the inclined floor of the chute adjacent the hood and pass by gravity thereon from the machine.

To prevent rotation of the turret plate 27 at such times as the machine is stopped in such rotative position that the drill 60 and punch 85 are withdrawn from the turret plate, a spring-backed plunger 102 (Figs. 8 and 11) is mounted in a socket member 103 secured to the machine frame and the plunger 102 is provided at its outer end with a roller 104 adapted to seat in one or another of the notches 32 formed in the margin of the plate.

A similar spring-backed plunger is mounted in the socket member 103 and provided at its outer end with a roller 105 adapted to seat in one of the notches 32 when the turret plate is stopped with vent caps in the drilling and punching positions to assure proper registry of the vent caps with the drilling and the punching devices.

In the operation of the machine, the drill 60 and the main-drive pulley 15 being continuously driven by the motor 11, the treadle 20 is depressed and the latch member 21 engaged in the slot 22 of the bracket 23 to hold the clutch 17 engaged and thus effect continuous driving of the shaft 16. Successive vent caps 29 are mounted in the respective sockets in the turret plate 27 at the front part of the latter's orbit, and the turret plate is periodically indexed through the action of the train of mechanism including link 36, bell crank lever 34, link 33, and pawl arm 31, the turret plate stopping with one of the vent caps at the drilling position and another at the punching position.

As the turret plate is so stopped, the downward movement of the slide 63 brings the presser foot 61 into contact with the vent cap at drilling position and immediately thereafter the rotating drill 60 is lifted, to drill the vent aperture 38 in the cap, by the train of mechanism including the bell crank lever 56, link 55, arm 54, rock shaft 50, and arm 53, and then lowered clear of the vent cap and the turret plate while the rising movement of the slide 63 lifts the presser foot 61 clear of the work.

In the downward movement of the slide 63 the stem 79 of the rack 77 is stopped by contact of the collar 84 with the bracket 80 before the slide 63 has reached its lowermost position and in the latter part of the upward movement of the slide 63 the rack 77 is lifted by engagement of the bracket 62 with the collar 83, which drives the strip feeding roll 70 through the train of mechanism including the ball clutch structure 75, 76 (Fig. 10), the shaft 74 and gears 73, 72, thus stepping forward the strip 66 of baffle plate material.

In the downward movement of the slide 63 the punch 85 is forced through the die 87 and into one of the vent caps 29, punching a baffle plate 86 from the strip 66 and mounting it in the annular groove 93 formed in the vent cap, the punch then being lifted clear of the work in the rising movement of the slide.

During the rising movement of the drill 60 the plunger 95 is lifted by the train of mechanism including the bell crank lever 56, the arm 99 thereof, the arm 98, rock shaft 97 and arm 96, dislodging one of the vent caps from the turret plate and discharging it from the machine through the chute 100.

The drilling of the vent caps and mounting of the baffle plates therein is thus effected simultaneously and the finished work is discharged from the machine, the operation being rapid and almost entirely automatic, the operator being required only to mount the successive vent caps in the turret plate.

Various modifications are possible within the scope of our invention as defined in the appended claims.

We claim:

1. Apparatus of the character described comprising means for propelling a succession of vent-caps past a drilling position and a baffle-mounting position, means timed with the propelling means for drilling vent-apertures in the successive caps at the drilling position and means timed with the propelling means for mounting baffle members in the successive caps at the baffle-mounting position.

2. Apparatus of the character described comprising means for propelling a succession of vent-caps past a drilling position and a baffle-mounting position, means timed with the propelling means for drilling vent-apertures in the successive caps at the drilling position and means timed with the propelling means for forming baffle members and mounting them in the successive caps at the baffle-mounting position.

3. Apparatus of the character described comprising means for feeding a strip of baffle-forming material, a through-apertured female die member and a punch operable therethrough for punching successive baffle members from the strip, and means for presenting successive vent-caps in position for the punch to force the successive baffle members, through the female die member, into the successive vent caps.

4. Apparatus as defined in claim 3 including means interconnecting the strip-feeding means, the punching means and the cap-presenting means for actuating them all in timed relation to each other.

5. Apparatus of the character described comprising means for propelling in determinately spaced relation a succession of vent-caps, means timed with the propelling means for drilling vent-apertures in the successive caps and means timed with the propelling means and the drilling means for forming baffle members and mounting them in the successive caps.

6. Apparatus as defined in claim 5 in which the means for forming and mounting the baffle members comprises means for feeding a strip of baffle-forming material and punch means for punching a baffle member therefrom and forcing it into the cap at the same stroke.

7. Apparatus of the character described comprising a turret formed with a circumferential series of through-aperture sockets each formed to seat a vent-cap, a presser member adapted to be brought into contact with successive caps at one side of the turret to hold the cap in the socket, and a drill so constructed and arranged as to operate upon the cap from the other side of the plate while the cap is held in the socket by the said presser member.

8. Apparatus of the character described comprising a turret formed with a circumferential series of sockets each formed to seat a vent-cap, means for indexing the turret and means timed with the indexing means for forming baffle members and mounting them in the successive caps, the baffle-forming and mounting means comprising a punch mechanism positioned in the orbit of the turret and means for feeding a strip of baffle-forming material to the punch mechanism.

9. Apparatus of the character described comprising a female, through-aperture die member formed with notch-forming elements and a punch complementally formed for coaction therewith and formed with a rounded end face adapted to deform a blank in forcing it through the female die member.

10. Apparatus of the character described comprising a member formed with through-aperture sockets for propelling in determinately spaced relation a succession of articles mounted in the sockets, means for operating upon the articles in succession while they are mounted in the sockets, and means for forcing the articles in succession from their sockets and disposing of them, the last said means comprising a plunger for pushing the articles upward out of their sockets, and means for pushing the articles laterally off of the plunger.

In witness whereof we have hereunto set our hands this 30th day of June, 1927.

BENJAMIN A. EVANS.
WILLIAM H. SLABAUGH.